United States Patent [11] 3,566,162

[72] Inventor David J. Warrender
Berkeley, Calif.
[21] Appl. No. 704,643
[22] Filed Feb. 12, 1968
[45] Patented Feb. 23, 1971
[73] Assignee Lynch Communications Systems, Inc.
San Francisco, Calif.

[54] GATING CIRCUIT
5 Claims, 2 Drawing Figs.

[52] U.S. Cl. .......... 307/310, 307/253, 307/243
[51] Int. Cl. .......... H03k 17/14, H03k 17/56
[50] Field of Search .......... 307/310; 328/154; 307/243

[56] References Cited
UNITED STATES PATENTS

| | | | |
|---|---|---|---|
| 3,092,730 | 6/1963 | Rowell .......... | 307/310 |
| 3,135,873 | 6/1964 | Werme .......... | 307/259 |
| 3,194,985 | 7/1965 | Smith et al. .......... | 307/243 |
| 3,230,397 | 1/1966 | Linder .......... | 307/243 |
| 3,324,422 | 6/1967 | Luna .......... | 307/310 |
| 3,329,836 | 7/1967 | Pearlman .......... | 307/310 |

*Primary Examiner*—Donald D. Forrer
*Assistant Examiner*—Harold A. Dixson
*Attorney*—Mellin, Moore and Weissenberger

ABSTRACT: This inherently temperature-compensated and supply-voltage-compensated gating circuit is capable of maintaining a constant no-signal output pedestal. It has a constant input impedance and eliminates switching transients in the gates by maintaining current flow at all gates at all times.

INVENTOR.
DAVID J. WARRENDER
BY
Mellin, Moore & Weissenberger
ATTORNEYS

GATING CIRCUIT

SUMMARY OF THE INVENTION

The invention relates to gating circuits and, more particularly, to a simple temperature-compensated gating circuit useful in connection with the preparation of signal samples from a plurality of inputs for subsequent time division multiplexing.

In a typical PCM carrier system for multiplexing of telephone circuits, 24 circuits are cyclically sampled, and the samples are encoded into digital form for transmission over a common line and decoding and distribution at the other end. The successive sampling of the 24 channels is accomplished by gating circuits, driven by a ring counter, which successively feed samples of the signals from the 24 individual channels into a common output circuit in a predetermined time sequence.

The gating circuit of this invention is adapted to be driven by a ring counter such as that disclosed in the copending application of Frederik Nordling entitled RING COUNTER, which is being filed concurrently herewith. Previously, it had been considered necessary to use bilateral gates employing transformer driven diode quads to provide the necessary pedestal stability. More recent circuits require either costly matched transistors, or field effect transistors which have no gain. All the above circuits suffer from a changing input impedance during gating.

The present circuit achieves the commutating gating function without matched transistors or field effect transistors and with inherent gain and without producing impedance changes in the analogue gate inputs. The present circuit is also very effective in maintaining a constant no-signal pedestal without any feedback circuits or other apparatus. This is particularly desirable, because it allows a similar current to be generated in the opposite direction and added to the pedestal, resulting in a net DC cancellation such that a zero signal at the analogue input will result in a zero signal at the output, regardless of transient conditions during switching. This restoration of analogue zero level at the output, which is not an elimination of the DC component, is mandatory if the signal is to be fed to the compressor, a nonlinear device with symmetry about zero, without generating sever asymmetric distortion.

A particularly troublesome factor in the maintenance of a constant or zero pedestal is the circuit temperature and its effect on the gating transistors. The present circuit overcomes this difficulty by providing for inherent temperature compensation of all temperature dependent transistor parameters of significance.

It is the object of this invention to provide a simple, temperature-compensated gating circuit which is capable of maintaining a constant no-signal output pedestal.

It is a further object of this invention to provide a circuit of the type described which is capable of relatively fast switching from one signal input to another.

It is still another object of the invention to provide a gating circuit in which constant no-signal current is maintained through all the gate transistors regardless of whether they are blocked or opened, thereby eliminating switching transients in the gates.

It is still a further object of the invention to provide a gating circuit with constant input impedance and the ability to give gain.

DETAILED DESCRIPTION OF THE PREFERRED EMBODIMENT

Figures 1, 2:
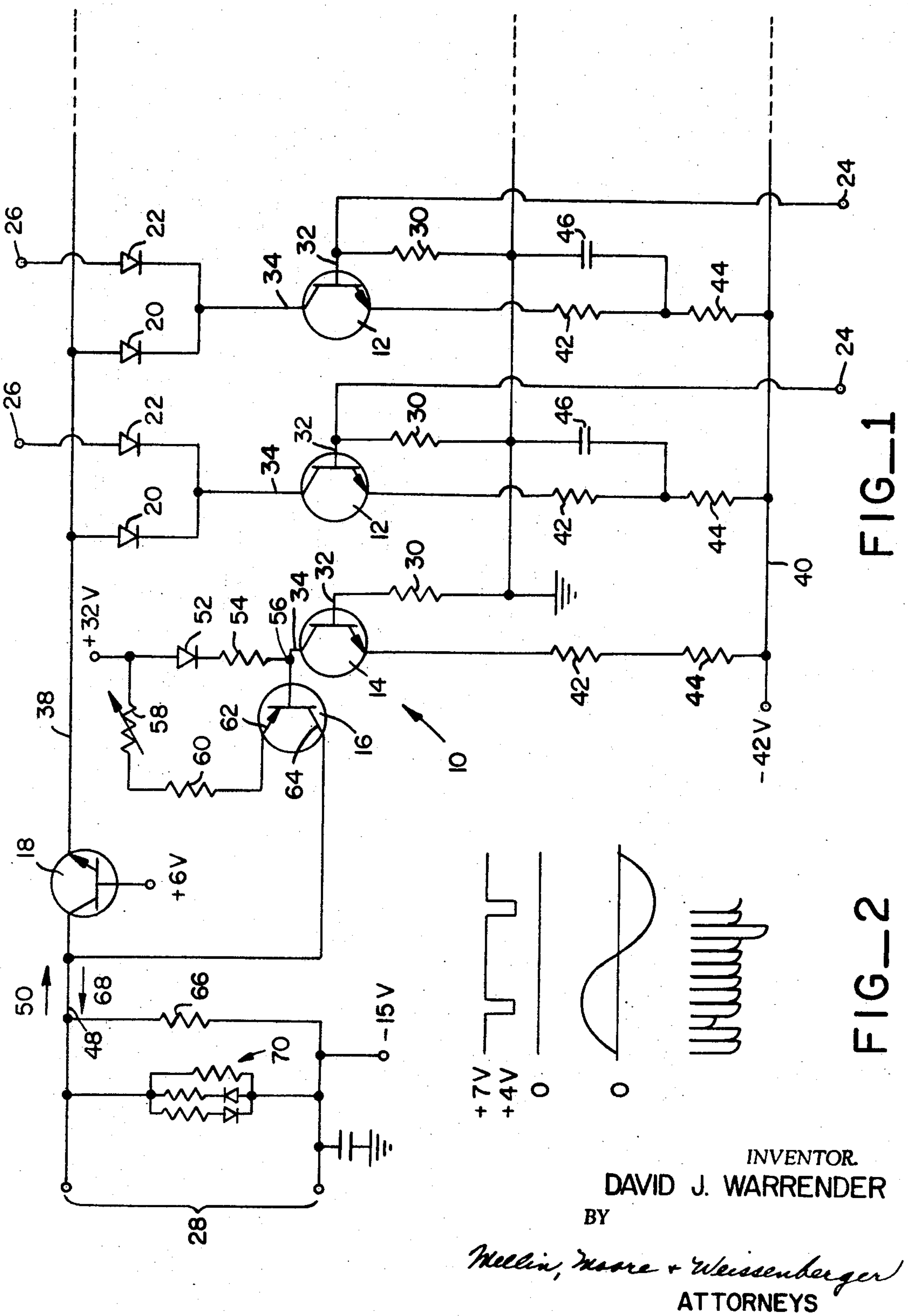
FIG. 1 is a schematic diagram of the circuit of this invention.
FIG. 2 is a diagram of the waver form present at various places in the circuit.

Bascially, the circuit of this invention functions on the principles that each of the channels is always present at the respective gate transitor's collector, but that the signal from each channel is drained off through a gating circuit from all stages except the one whose signal is at any given time intended to be present in the output. Because the current flow through the analogue gates is never interrupted, there are no switching transients in the gates, and switching can be extremely fast. The transistor capacitance of the gate stages has little effect on the switching speed capability because it looks into the very low input impedance of the impedance-transforming (common base) stage.

The no-signal output current itself is regulated by a mock gate arrangement which changes the output circuit characteristics in the same manner as the analogue gates change their characteristics under the influence of temperature or power supply variations.

Referring now to FIG. 1, the circuit 10 of this invention will be seen to consist essentially of analogue gates 12, mock gate 14, inverter stage 16, impedance-transforming stage 18, and switching diodes 20 and 22. Only two of the analogue gates 12 and associated switching diodes 20, 22 have been shown in FIG. I, but it will be understood that any number of analogue gates may be present as the requirements of a particular application may dictate (e.g., 24 gates in this particular PCM).

The input analogue signal (middle curve of FIG. 2) for each channel to be sampled appears at the channel's input terminal 24. The gating pulses produced by the ring counter (upper curve of FIG. 2) appear at the gating terminals 26. The signal output of the circuit 10 (bottom curve of FIG. 2) appears across the terminals 28.

DC voltages appropriate for the operation of the circuit 10 are applied as indicated in FIG. 1 and may be of the magnitudes indicated in FIG. 1. It will be understood that the numerical values of the voltages given in FIG. 1 are intended as a matter of example only and are not, as such, crucial to the operation of the invention.

The operation of the circuit is as follows:

The signal 24 is fed to the base 32 of the analogue gate transistor 12, the input impedance being set primarily by resistor 30. The transistor 12 is so biased that it will be conducting throughout the entire voltage swing of the signal 24 and, consequently, will serve as an amplifier of that signal voltage 24 flows through the collector-emitter circuit of the transistor 12. The voltage in bus 38 is maintained at approximately +6 V. When a given gate is closed, the voltage at its terminal 26 is approximately +6 v. Consequently, current can flow from terminal 26 through switching diode 22 and transistor 12 to the negative bus 40. In this condition, the DC voltage at the collector 34 of the transistor 12 is higher than the voltage in bus 38, and no current can flow through switching diode 20.

When a gating pulse from the ring counter now appears at the terminal 26 of a given stage, the voltage at that terminal 26 drops to +4 v. Under that condition, current can flow from bus 38 through gating diode 20 and transitor 12 to the negative bus 40. Since, however, the collector 34 is now more positive than the terminal 26, no current can flow through switching diode 22. Consequently, the appearance of a gate pulse at terminal 26 causes the signal generated across transistor 12 of that stage to be fed toward the output 38 for the duration of the gating pulse at terminal 26.

The quiescent current flowing through each of the analogue gate transistors 12 is determined by resistors 42, 44, which, in a typical application, have a resistance ratio of approximately 1:20. The negative supply voltage (in this case −42 V.) less than the small drop from the emitter of 12 to ground in conjunction with the series combination of resistors 42 and 44 determine the DC pedestal current in the gate. The AC current is determined by the AC input voltage at 24 and the resistor 42, resistor 44 being effectively held at AC ground by capacitor 46. The combination of these currents decreased by $\alpha$ of transistor 12 flows through the collector of 12. The negative emitter bias voltage appearing in bus 40 is chosen to be very large with respect to the base-emitter voltage of transistors 12 and transistor betas are kept large so that variations of characteristics between individual transistors can have no more than an insignificant effect on the signal produced thereby. This eliminates the costly requirement of the matched transistors.

The temperature-compensating operation of the circuit is as follows:

A temperature increase in the physical environment of the circuit will cause the analogue gates 12 to draw more current for a given level of the analogue signal 24. This increased current is reflected as an increase in the current flowing in wire 48 in the direction of arrow 50. Since the mock gate 14 is physically positioned in the same environment as the analogue gates 12 and the other components of the circuit, the same temperature rise will also cause the current through mock gate 14 to increase in like manner. The mock gate current is drawn from the +32 v. supply through diode 52 and resistor 54. The increase in current through resistor 54 results in a greater voltage drop across that resistor, and, consequently, the potential of point 56 is lowered. The lowering of the potential of point 56 lowers the base potential of the inverter transitor 16 and increases the current flow therethrough.

The current flow of inverter transistor 16 is from the +32 v. supply through the null-adjusting potentiometer 58 and resistor 60, emitter 62, collector 64, and resistor 66 to the +15 v. supply. Consequently, the inverter transistor current appears as a current in wire 48 in the direction of arrow 52. When the null-adjusting potentiometer 58 is properly adjusted, currents 50 and 68 cancel each other out when there is no analogue signal present at the terminal 24 of the gate being sampled.

It will be readily seen that the temperature variation which caused an increase in current 50 has thus been made to cause an equal increase in current 50 has thus been made to cause an equal increase in current 68, thereby maintaining the null balance at output 28.

The temperature variation of the emitter-base voltage of the inverter transistor 16 is itself compensated for by a similar characteristic of the diode 52. The effect of temperature on the beta of the inverter transistor 16 is, in turn, compensated by a like variation in the beta of the impedance-transforming transistor 18. The sole other function of the transistor 18 is to provide an impedance transformation from the low impedance current node termination of bus 38 to the high impedance necessary for the compressor; i.e., the collector of transistor 18 simulates a current source.

This compressor 70 is used to convert the signal current on the bus 48 into a compressed voltage 28 in this example. The compressing of the signal is a requirement dictated by the this PCM carrier system for which this gating circuit is intended and is not necessary for operation of the portion of the gating circuit lying ahead of it, although it does generate the necessity for closely controlled zero signal conditions in this case.

The characteristics of the compressor 70 are such that its diodes have a relatively high internal capacitance. Consequently, the signal appearing at the terminals 28 is not a series of square pulses of varying amplitude as might be expected, but rather a series of pulses with slow exponential rise as in FIG. 2. The time required for the exponential portion of each pulse to reach an arbitrarily close approximation of the sampled signal during any one sampling period is, therefore, the factor which determines the switching speed capability of the gating circuit.

It will be seen that the present invention provides a simple but highly effective gating circuit which is capable of maintaining an accurately nulled pedestal regardless of temperature and supply voltage changes. It will be readily understood that so long as all the gates are equipped with transistors of the same type it is possible to obtain near perfect stability of the circuit without going through the expense of obtaining perfectly matched transistors. In addition the gain of the gate stage and the input impedance may be chosen over a large range by choosing appropriate values for resistors 42 and 30. Resistors 44, of course, do have to be matched so that the no-signal current 50 produced by each analogue gate is the same. Resistors 42 require matching to obtain uniform AC gain but usually need not be as precisely matched as resistors 44 as long as the resistance of resistors 44 is much greater than the resistance of resistors 42.

The concept of this invention can, of course, be carried out in many different ways, and I do not intend to be restricted by the particular embodiment or values shown in this application. Consequently, the scope of this invention is not to be deemed limited by the embodiment shown and described, but only by the the scope of the following claims.

I claim:

1. A temperature-compensated gating circuit for selectively applying alternating-current signals to a symmetrical nonlinear output device, comprising:

a. a signal output;
b. a plurality of AC signal inputs;
c. first semiconductor means including first transistor means associated with each of said signal inputs to produce an AC-modulated DC signal representative of the AC signal at the signal input associated therewith;
d. switching means for selectively connecting said first semiconductor means to said signal output;
e. second semiconductor means permanently connected to said output and arranged to produce a constant DC signal of a level equal to the DC signal produced by said first semiconductor means in the absence of any AC signal at their signal inputs, but of opposite sign;
f. said second semiconductor means including second transistor means having substantially identical temperature characteristics as said first transistor means and being subjected to the same temperature environment; and
g. whereby the DC component of the output signal is eliminated regardless of temperature variations to prevent distortion of the AC signal by the nonlinear output device.

2. The circuit of claim 1 in which said first semiconductor means further include impedance-matching means connected between said signal output and the emitter-collector circuits of said first transistor means, and in which said second semiconductor means include inverter means connected between said signal output and the emitter-collector circuit of said second transistor means; said impedance-matching means and said inverter means having matched temperature characteristics and being subjected to the same temperature environment.

3. The circuit of claim 2 in which said inverter means include third transistor means, and diode means connected in parallel with the base-emitter circuit of said third transistor means, said diode means having temperature characteristics matched to the base-emitter voltage temperature characteristics of said third transistor means, and being subjected to the same temperature environment.

4. A temperature-compensated gating circuit comprising:

a. a nonlinear signal processing circuit;
b. a plurality of identical analogue gate states each including an analogue signal input, analogue gate transitor means, and associated circuitry;
c. a mock gate stage identical to said analogue gate states and exposed to the same temperature environment but having a fixed potential equal to the zero level of said analogue input signals applied to its analogue signal input;
d. gating means for selectively connecting said analogue gate stages to said processing circuit to produce an analogue signal current therein;
e. inverter means connected to said mock gate stage and said output to produce in said output a constant signal current of opposite direction to said analogue signal current, and of a magnitude equal to the analogue signal current corresponding to a zero signal;

f. an impedance-transforming device connected between said analogue gate stages and said common output to present a high impedance at said output; and g. said impedance-transforming device and said inverter means being transistors, whereby the beta variation of said impedance-transforming transistor due to temperature changes offsets the effect of the beta variation of said inverter transistor due to the same temperature changes.

5. A temperature-compensated circuit for applying signals to a nonlinear signal processing device comprising:

a. a source of signals to be processed;

b. a nonlinear processing circuit;

c. signal amplifier means connected to said signal source and processing circuit, and arranged to cause a signal current to flow through said circuit in a first direction;

d. compensating amplifier means connected to said processing circuit and arranged to cause a compensating current to flow through said processing circuit in the opposite direction, the magnitude of said compensating current being equal to the magnitude of said signal current when said signal is zero; and e. said signal amplifier means and said compensating amplifier means being subjected to the same temperature environment.